(12) United States Patent
Dutta et al.

(10) Patent No.: US 11,550,631 B2
(45) Date of Patent: Jan. 10, 2023

(54) DISTRIBUTION OF QUANTITIES OF AN INCREASED WORKLOAD PORTION INTO BUCKETS REPRESENTING OPERATIONS

(71) Applicant: Hewlett Packard Enterprise Development LP, Houston, TX (US)

(72) Inventors: Mayukh Dutta, Bangalore Karnataka (IN); Manoj Srivatsav, Bangalore Karnataka (IN); Jharna Aggarwal, Bangalore Karnataka (IN); Manu Sharma, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 234 days.

(21) Appl. No.: 16/861,840

(22) Filed: Apr. 29, 2020

(65) Prior Publication Data
US 2020/0394075 A1     Dec. 17, 2020

(30) Foreign Application Priority Data

Jun. 17, 2019   (IN) .............................. 201941024013

(51) Int. Cl.
  *G06F 9/46*      (2006.01)
  *G06F 9/50*      (2006.01)
  *G06F 3/06*      (2006.01)

(52) U.S. Cl.
  CPC ............ *G06F 9/5016* (2013.01); *G06F 3/061* (2013.01); *G06F 3/067* (2013.01); *G06F 3/0631* (2013.01); *G06F 9/5038* (2013.01); *G06F 9/5083* (2013.01); *G06F 2209/5019* (2013.01); *G06F 2209/5022* (2013.01)

(58) Field of Classification Search
  CPC .... G06F 9/5016; G06F 9/5038; G06F 9/5083; G06F 3/061; G06F 3/0631; G06F 3/067; G06F 2209/5019; G06F 2209/5022
  See application file for complete search history.

(56) References Cited

U.S. PATENT DOCUMENTS

| 8,935,500 B1 | 1/2015 | Gulati et al. |
| 8,949,483 B1 | 2/2015 | Martin |

(Continued)

FOREIGN PATENT DOCUMENTS

WO     2015/016909 A1     2/2015

OTHER PUBLICATIONS

Li et al., A Data- and Workload-Aware Algorithm for Range Queries Under Differential Privacy, VLDB, vol. 7, No. 5, 2014, 12 pages.*

(Continued)

*Primary Examiner* — Diem K Cao
(74) *Attorney, Agent, or Firm* — Trop, Pruner & Hu, P.C.

(57) ABSTRACT

In some examples, a computing system receives an indication of an increased workload portion to be added to a workload of a storage system, the workload comprising buckets of operations of different characteristics. The computing system computes, based on quantities of operations of the different characteristics in the workload, factor values that indicate distribution of operations of the increased workload portion to the buckets of operations of the different characteristics, and distributes, according to the factor values, the operations of the increased workload portion into the buckets of operations of the different characteristics.

20 Claims, 7 Drawing Sheets

(56) References Cited

U.S. PATENT DOCUMENTS

| | | | |
|---|---|---|---|
| 9,575,664 B2 | 2/2017 | Chen et al. | |
| 9,575,810 B2 | 2/2017 | Clarke et al. | |
| 10,606,519 B1* | 3/2020 | Shveidel | G06F 3/067 |
| 2004/0194095 A1* | 9/2004 | Lumb | G06F 9/4887 718/100 |
| 2011/0119679 A1* | 5/2011 | Muppirala | G06F 3/0611 718/105 |
| 2014/0130055 A1 | 5/2014 | Guha | |
| 2016/0349992 A1 | 12/2016 | Basak et al. | |
| 2019/0332276 A1* | 10/2019 | Gupta | G06F 3/0655 |

OTHER PUBLICATIONS

Gulati et al., "Modeling Workloads and Devices for IO Load Balancing in Virtualized Environments", ACM, Jan. 2009, 9 pages.

Juan Novella, "Introducing Pure1 Meta: Pure's AI Platform to Enable Self-Driving Storage", available online at <https://blog.purestorage.com/introducing-pure1-meta-pures-ai-platform-enable-self-driving-storage/> Jun. 13, 2017, 11 pages.

Pure Storage, "Machine Learning with Pure1 Meta", transcript of video content, accessed and transcribed Apr. 19, 2018, <https:/www.youtube.com/watch?v=n7R4I4O0dLE>, Nov. 16, 2017, 8 pages.

* cited by examiner

Table 1

| Time Interval | Bucket A | Bucket B | Bucket C | Bucket D | Total_IQs (A+B+C+D) |
|---|---|---|---|---|---|
| 1 | 575 | 295 | 28 | 17,310 | 18,208 |
| 2 | 490 | 115 | 10 | 2,545 | 3,160 |
| 3 | 3,185 | 170 | 25 | 13,665 | 17,045 |
| 4 | 600 | 450 | 22 | 15,630 | 16,702 |
| 5 | 3,145 | 265 | 10 | 9,580 | 13,000 |
| 6 | 1,565 | 245 | 3 | 460 | 2,273 |
| 7 | 955 | 465 | 1 | 12,475 | 13,896 |
| 8 | 4,815 | 55 | 10 | 14,795 | 19,675 |
| 9 | 305 | 60 | 12 | 21,535 | 21,912 |
| 10 | 2,465 | 410 | 20 | 910 | 3,805 |

Table 2

| Time Interval | Rolling_corr (A, Total) | Rolling_corr (B, Total) | Rolling_corr (C, Total) | Rolling_corr (D, Total) |
|---|---|---|---|---|
| 1 | | | | |
| 2 | | 406 | | |
| 3 | | | | |
| 4 | 0.34 | 0.62 | 0.97 | 0.98 |
| 5 | 0.48 | 0.61 | 0.78 | 0.98 |
| 6 | 0.18 | 0.23 | 0.92 | 0.99 |
| 7 | -0.19 | 0.73 | 0.58 | 0.99 |
| 8 | 0.65 | -0.28 | 0.53 | 0.98 |
| 9 | 0.15 | -0.49 | 0.75 | 0.98 |
| 10 | -0.05 | -0.80 | -0.46 | 0.97 |

| Time Interval | Normalized Correl A | Normalized Correl B | Normalized Correl C | Normalized Correl D |
|---|---|---|---|---|
| 1 | | | | |
| 2 | | | | |
| 3 | | | | |
| 4 | 0.03 | 0.01 | 0.00 | 0.88 |
| 5 | 0.07 | 0.01 | 0.00 | 0.81 |
| 6 | 0.03 | 0.01 | 0.00 | 0.79 |
| 7 | 0.00 | 0.02 | 0.00 | 0.82 |
| 8 | 0.14 | 0.00 | 0.00 | 0.75 |
| 9 | 0.02 | 0.00 | 0.00 | 0.83 |
| 10 | 0.00 | 0.00 | 0.00 | 0.82 |

Table 3

FIG. 5

| Time Interval | Delta IOs A | Delta IOs B | Delta IOs C | Delta IOs D | Total Delta IOs |
|---|---|---|---|---|---|
| 1 | | | | | |
| 2 | | | | | |
| 3 | | | | | |
| 4 | 54 | 21 | 3 | 1,593 | 1,670 |
| 5 | 104 | 18 | 2 | 1,177 | 1,300 |
| 6 | 8 | 1 | 0 | 217 | 227 |
| 7 | - | 38 | 1 | 1,351 | 1,390 |
| 8 | 308 | - | 1 | 1,659 | 1,968 |
| 9 | 51 | - | 1 | 2,139 | 2,191 |
| 10 | - | - | - | 381 | 381 |

Table 4

FIG. 6

Table 5

| Time Interval | Updated A | Updated B | Updated C | Updated D | Updated Total IOs |
|---|---|---|---|---|---|
| 1 | 575 | 295 | 28 | 17,310 | 18,208 |
| 2 | 490 | 115 | 10 | 2,545 | 3,160 |
| 3 | 3,185 | 170 | 25 | 13,665 | 17,045 |
| 4 | 654 | 471 | 25 | 17,223 | 18,372 |
| 5 | 3,249 | 283 | 12 | 10,757 | 14,300 |
| 6 | 1,573 | 246 | 3 | 677 | 2,500 |
| 7 | 955 | 503 | 2 | 13,826 | 15,286 |
| 8 | 5,123 | 55 | 11 | 16,454 | 21,643 |
| 9 | 356 | 60 | 13 | 23,674 | 24,103 |
| 10 | 2,465 | 410 | 20 | 1,291 | 4,186 |

DISTRIBUTION OF QUANTITIES OF AN INCREASED WORKLOAD PORTION INTO BUCKETS REPRESENTING OPERATIONS

BACKGROUND

An arrangement of storage devices can be used to store data. Requesters can issue requests to access data, which can result in workloads performed at a storage system that controls access of the storage devices. Changes in the workloads can affect performance at the storage system.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "storage system" can refer to a platform including hardware and machine-readable instructions to implement storage of data. A storage system can be implemented using a combination of processing resources, memory resources, and communication resources.

A processing resource can include a processor, multiple processors, or a portion (e.g., a core or multiple cores) of a processor. A memory resource can include a memory device or multiple memory devices, such as a dynamic random access memory (DRAM), a static random access memory (SRAM), and so forth. An example of a memory resource is a cache memory to temporarily store data that is held in a persistent storage. A communication resource can include a network interface controller (or a portion thereof) or a port that is used to communicate over a network. In further examples, a storage system can include other resources, including physical resources and/or virtual resources.

A storage system can include or have access to a storage device (or multiple storage devices). A "storage device" can include persistent storage implemented using nonvolatile storage device(s), such as disk-based storage device(s) (e.g., hard disk drive(s) (HDD(s)), or the like), solid state storage device(s) (e.g., solid state drive(s) (SSD(s)), or the like), and so forth.

Requesters can issue requests for accessing data stored in storage devices. Such requests result in workloads being performed by the storage system. A "workload" can refer to a collection of activities in response to a request(s) of a corresponding requester(s).

In some cases, it can be difficult to determine how an increase in workload can impact performance of a storage system, or of various resources of the storage system. Heavy usage of a resource (e.g., a processing resource, a memory resource, and/or a communication resource) of a storage system can lead to reduced overall performance of the storage system, which can cause requesters to experience slow data access speeds (increased latency).

A workload can be represented using a collection of parameters that describe respective characteristics of the workload. A "collection of parameters" can refer to a collection that includes a single parameter, or alternatively, a collection that includes multiple parameters. Examples of parameters that describe characteristics of the workload can include an input/output (I/O) size of a respective request associated with the workload, a count of a number of requests of a respective I/O size, and a type of a respective request.

Although example parameters that represent a workload are listed, it is noted that in other examples, additional or alternative parameters can be used to represent characteristics of a workload, such as characteristics of requests associated with the workload. A request is "associated with" a workload if the request submitted by a requester caused the workload (or a portion of the workload) to be performed.

A request of a particular I/O size refers to a request that accesses (reads or writes) data of the particular I/O size, e.g., data having a 4-kilobits (kb) size, an 8-kb size, a 16-kb size, a 32-kb size, and so forth. A count of a number of requests of a particular I/O size refers to a quantity of the requests of the particular I/O size. Types of requests can include a write request (a first type of request), a read request (a second type of request), and so forth.

A given workload may be associated with multiple requests of different characteristics (e.g., I/O sizes, request types, etc.). For example, the given workload may be associated with multiple requests of different I/O sizes.

Generally, the given workload can be represented by a collection of "buckets", where each bucket represents a quantity of requests of a respective different characteristic. For example, a first bucket can include a representation of a quantity of requests of a first I/O size, a second bucket can include a representation of a quantity of requests of a second I/O size different from the first I/O size, and so forth. The different buckets that represent the given workload may represent respective quantities of requests for corresponding intervals, such as time intervals. The different buckets that represent the given workload can be represented in the form of a histogram (or any other representation) that represents quantities from the buckets at corresponding intervals, such as time intervals.

Figure 1:
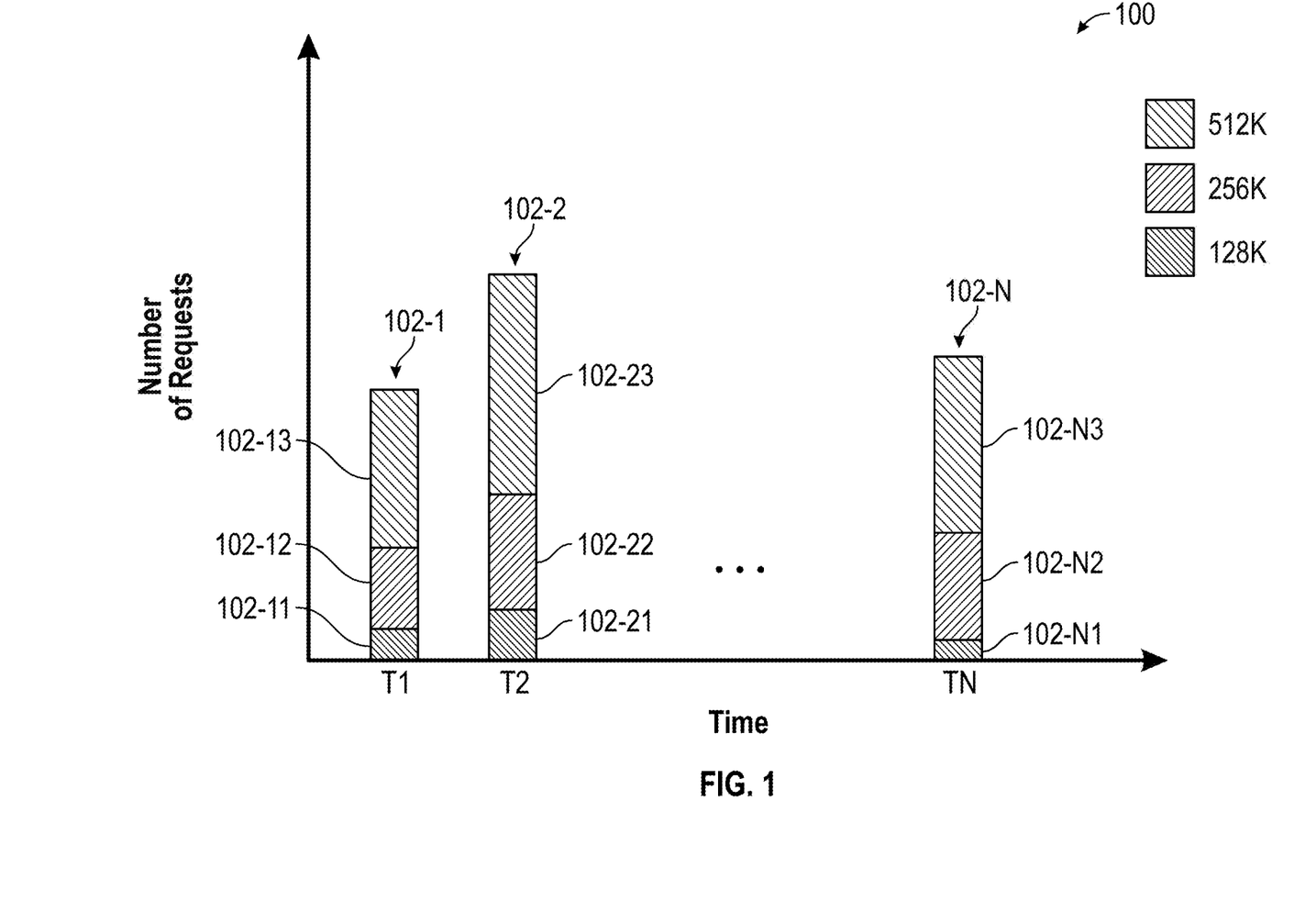
FIG. 1 shows a histogram of buckets of a workload according to some examples.

FIG. 1 shows an example histogram 100 of buckets representing quantities of requests of different I/O sizes. In the example histogram 100, the horizontal axis represents time, and the vertical axis represents a number (quantity) of requests. The histogram 100 includes multiple bars 102-1, 102-2, ..., 102-N (N≥2). Each bar 102-*i* (i=1 to N) is divided into multiple bar segments, and each bar segment represents a bucket representing a quantity of requests of a respective I/O size (or other characteristic) at a particular time interval. In the example of FIG. 1, different patterns of each bar segment represent respective different I/O sizes, such as 128 kb, 256 kb, and 512 kb. For example, the bar 102-1 at time interval T1 is divided into bar segments 102-11, 102-12, and 102-13 that represent respective buckets representing quantities of requests of corresponding different I/O sizes at time interval T1. The bar segment 102-11 represents a bucket representing a quantity of 128-kb requests (i.e., a quantity of requests that cause data of 128-kb size to be read or written) at time interval T1, bar segment 102-12 represents a bucket representing a quantity of 256-kb requests at time interval T1, and the bar segment 102-13 represents a bucket representing a quantity of 512-kb requests at time interval T1. The length of each bar segment provides an indication of the number of requests of the respective I/O size represented by the bar segment.

Although three I/O sizes are depicted in FIG. 1, it is noted that a different example can represent requests of additional or alternative I/O sizes.

Similarly, the bar 102-2 at time interval T2 is divided into respective bar segments 102-21, 102-22, and 102-23 representing respective buckets representing requests of different I/O sizes at time interval T2, and the bar 102-N at time interval TN is divided into respective bar segments 102-N1, 102-N2, and 102-N3 representing respective buckets representing requests of different I/O sizes at time interval TN.

The requests represented by the bars 102-1 to 102-N can be part of a given workload (or multiple workloads).

When simulating an increase in a given workload (e.g., an X % increase in workload that leads to the addition of an increased workload portion to the given workload), it can be difficult to determine an appropriate distribution of the increased workload portion across buckets representing requests having different characteristics (e.g., different I/O sizes) to provide a useful simulation of such an increase in the workload. The "increased workload portion" includes a number of requests by which the given workload is increased. As an example, it can be difficult to ascertain how the requests of the increased workload portion should be apportioned to a first bucket of requests of a first I/O size, a second bucket of requests of a second I/O size, and so forth. In other words, if the increased workload portion includes Y requests (Y≥1), it can be difficult to accurately determine what portions of the Y requests are to be distributed across N buckets (N≥1).

In accordance with some implementations of the present disclosure, techniques or mechanisms are provided to distribute quantities of I/O operations of an increased workload portion to buckets representing I/O operations of different characteristics (e.g., different I/O sizes). As used here, a bucket "representing" I/O operations of a characteristic refers to a bucket that represents a quantity of I/O operations of the characteristic. An I/O operation can refer to an operation related to access (read and/or write) of data, where the I/O operation can be performed in response to a request.

The distributing of quantities of I/O operations across buckets is based on computation of factor values based on quantities of I/O operations of the different characteristics (e.g., I/O operations of different sizes or of different types) in the workload. The computed factor values indicate a distribution of quantities of I/O operations of the increased workload portion to the buckets of I/O operations of the different characteristics. For example, the factor values can indicate that a quantity of a first subset of the I/O operations of the increased workload portion is to be distributed to a first bucket of I/O operations of a first I/O size, that a quantity of a second subset of the I/O operations of the increased workload portion is to be distributed to a second bucket of I/O operations of a first I/O size, and so forth.

Figure 2:
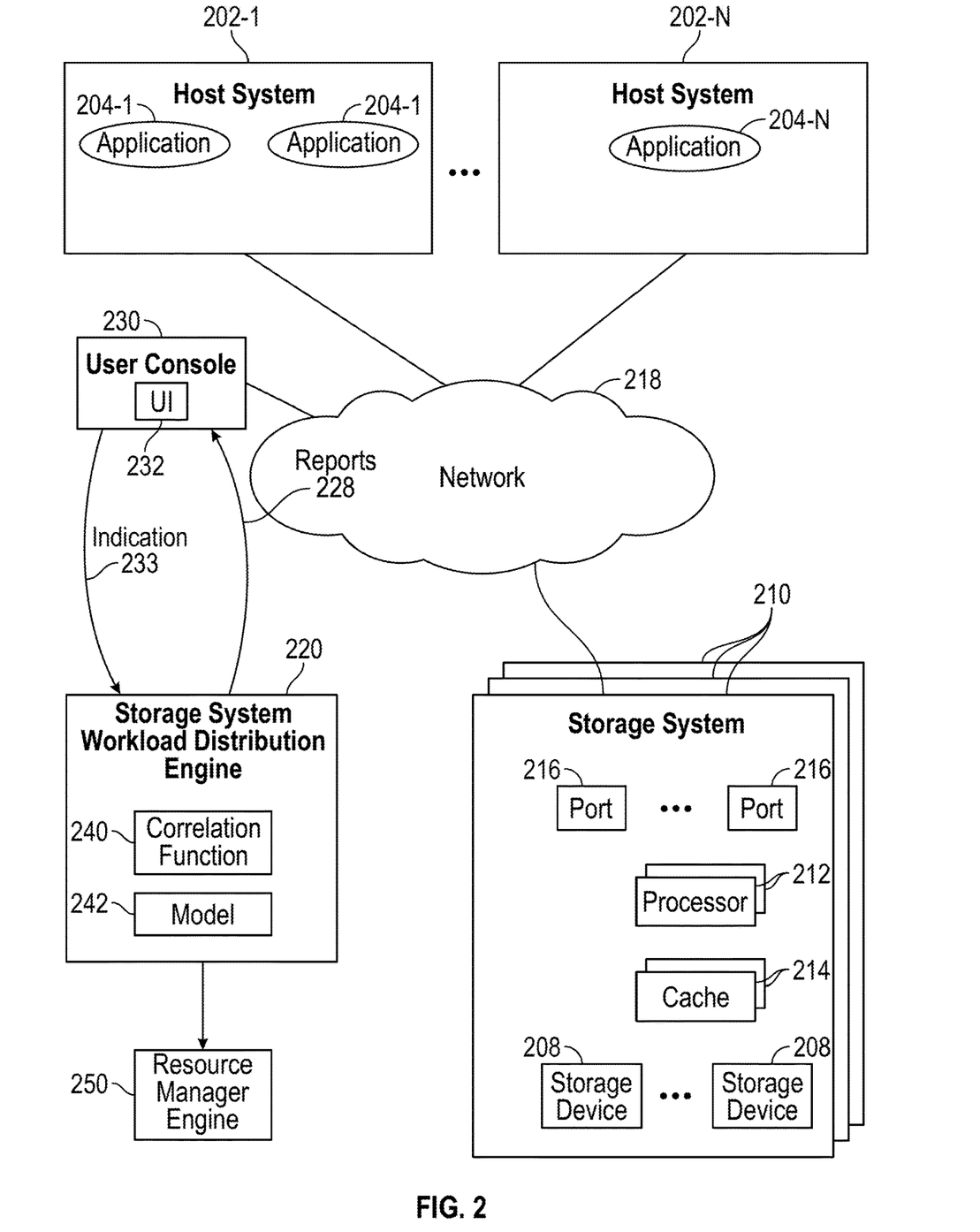
FIG. 2 is a block diagram of an arrangement that includes host systems, storage systems, and a workload distribution engine according to some examples.

FIG. 2 is a block diagram of an example arrangement that includes a number of host systems 202-1 to 202-N, where N≥1. Although multiple host systems are depicted in FIG. 2, it is noted that in other examples, just one host system may be present.

The host system 202-1 includes application programs 204-1. The host system 202-N includes an application program 204-N. Although examples according to FIG. 2 show application programs as examples of requesters that can issue requests to access data, it is noted that in other examples, different types of requesters can issue requests to access data.

The data accessed by requests from the requesters are stored by storage devices 208 of a storage system 210 (or multiple storage systems 210). The storage devices 208 can be implemented using disk-based storage devices (e.g., HDDs), solid state memory devices (e.g., SSDs), other types of persistent storage devices, or a combination thereof. The storage devices 208 can be arranged as an array (or multiple arrays) of storage devices.

Although FIG. 2 shows the storage devices 208 as being part of the storage system 210, in other examples, the storage devices 208 may be external of but accessible by the storage system 210.

The storage system 210 includes processors 212 and cache memories 214. The processors 212 can execute a data access program (in the form of machine-readable instructions) that manage access of data stored in the storage devices 208 in response to requests received from a requester based on access of a storage volume (or multiple storage volumes) by the requester. A cache memory 214 can be used to temporarily store data, such as write data to be written to the storage devices 208.

The storage system 210 further includes various ports 216. A "port" can refer to a communication interface through which a host system 202-*i* (i=1 to N) is able to access the storage system 210 over a network 218. Examples of the network 218 can include any or some combination of the following: a storage area network (SAN), a local area network (LAN), a public network such as the Internet, and so forth.

Each port 216 has a corresponding bandwidth that can be used to communicate data in response to access requests from requesters. A port can refer to a physical port or a logical port.

Although not shown, the host systems 202-1 and 202-N can each also include ports for communication over the network 218.

The ports 216, the processors 212, and the cache memories 214 are examples of resources of the storage system 210 that can be used to perform tasks associated with workloads performed in response to requests from respective requesters.

The ports 216 are examples of communication resources. The processors 212 are examples of processing resources. The cache memories 214 are examples of memory resources.

Figure 3:
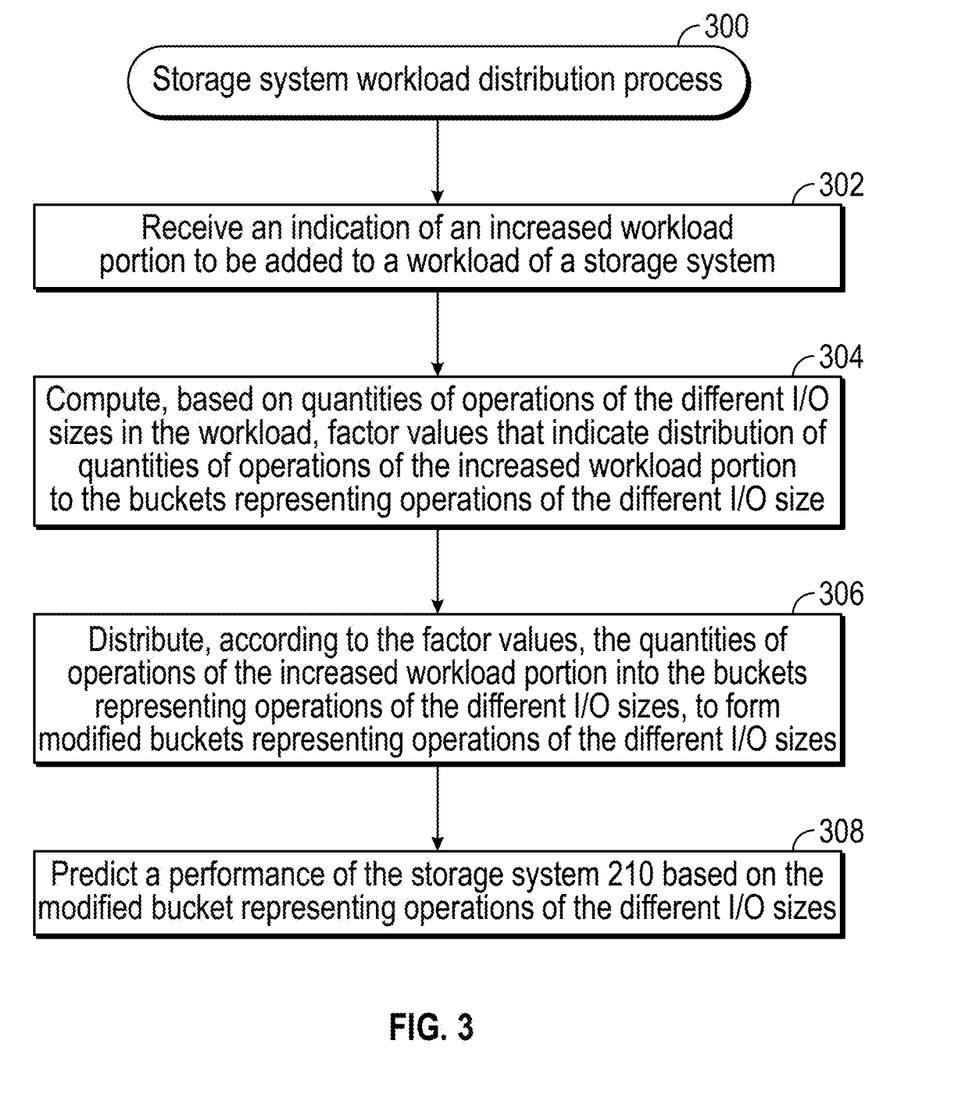
FIG. 3 is a flow diagram of a workload distribution process according to some examples.

FIG. 2 also shows a storage system workload distribution engine 220, which can perform a storage system workload distribution process, such as a process 300 shown in FIG. 3.

As used here, an "engine" or can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The storage system workload distribution engine 220 can be part of the storage system 210, or alternatively, can be separate from the storage system 210 and coupled to the network 218.

The following refers further to FIG. 3, which is described in conjunction with FIG. 2. The workload distribution process 300 includes receiving (at 302) an indication of an increased workload portion to be added to a workload of a storage system. The workload includes buckets representing operations of different I/O sizes. An example of a bucket representing operations is a bucket representing requests of a respective I/O size.

The indication (e.g., 233 in FIG. 2) that is received (at 302) can be based on a user input at a user interface (UI) 232 of a user console 230. A user console can refer to an electronic device, such as a desktop computer, a notebook computer, a tablet computer, a smartphone, and so forth. The user console 230 can display the UI 232.

In further examples, there may be multiple user consoles 230.

As an example, the UI 232 may present an option that allows a user at the user console 230 to specify that a given workload is to be increased by a selected percentage, such as by 10% or by some other percentage. The user may specify the increase in percentage of the given workload to determine an impact on resources of the storage system 210 due to the increased workload.

In other examples, the indication of increased workload can be provided by a different entity, such as a machine or a program.

The workload distribution process 300 computes (at 304), based on quantities of operations of the different I/O sizes in the workload, factor values that indicate distribution of quantities of operations of the increased workload portion to the buckets representing operations of the different I/O sizes. The factor values can be computed based on a correlation function (e.g., 240 in FIG. 2) or another type of function. In examples where the correlation function is used, the factor values that are computed are based on correlation coefficients calculated by the correlation function 240. A correlation function can refer to a function that computes a statistical correlation between variables, based on a spatial or temporal distance between the variables. In some examples of the present disclosure, the variables correlated by the correlation function 240 can include a quantity of operations in a bucket of operations and a total quantity of operations (discussed in detail further below).

The workload distribution process 300 further distributes (at 306), according to the factor values, the quantities of operations of the increased workload portion into the buckets representing operations of the different I/O sizes, to form modified buckets representing operations of the different I/O sizes. The distribution of the quantities of operations of the increased workload portion includes distributing a first quantity of the operations of the increased workload portion into a first bucket representing operations of a first I/O size, distributing a second quantity of the operations of the increased workload portion into a second bucket representing operations of a second I/O size, and so forth.

The workload distribution process 300 predicts (at 308) a performance of the storage system 210 based on the modified bucket representing operations of the different I/O sizes. As discussed further below, the prediction can be based on use of a predictive model (e.g., 242 in FIG. 2) that receives the modified buckets representing operations of the different I/O sizes as input.

As noted above, in some examples, the factor values used for distributing quantities of operations of the additional workload portion to corresponding buckets are based on correlation coefficients computed for each bucket representing I/O operations at each respective time interval, such as time interval T1 to TN in FIG. 1. For example, in the example of FIG. 1, at each time interval Ti (i=1 to N), the three buckets representing I/O operations according to different characteristics (represented by respective three bar segments of the bar 102-$i$) can be associated with respective variables X1, X2, and X3, where X1 can represent a quantity of I/O operations (e.g., quantity of requests) of a first I/O size (e.g., 128 kb), X2 can represent a quantity of I/O operations (e.g., quantity of requests) of a second I/O size (e.g., 256 kb), and X3 can represent a quantity of I/O operations (e.g., quantity of requests) of a third size (e.g., 512 kb). Given the variables X1, X2, and X3 for each time interval Ti, the following correlation functions can be computed:

$$CC1 = \text{corr}(X1, Xt), \quad \text{(Eq. 1)}$$

$$CC2 = \text{corr}(X2, Xt), \quad \text{(Eq. 2)}$$

$$CC3 = \text{corr}(X3, Xt), \quad \text{(Eq. 3)}$$

where Xt represents a total quantity of I/O operations (e.g., requests) at each time interval Ti; effectively, Xt=X1+X2+X3 at time interval Ti. In Eqs. 1-3 above, the corr( ) is the correlation function 240 of FIG. 2.

The correlation coefficients CC1, CC2, and CC3 are computed for each time interval T1, ..., TN. In other words, at each time interval Ti, three correlation coefficients CC1, CC2, and CC3 are computed in the example where there are three buckets in each time interval.

The factor values for distributing the additional workload portion can be computed based on the correlation coefficients by the storage system workload distribution engine 220, as explained further below.

Figure 4:
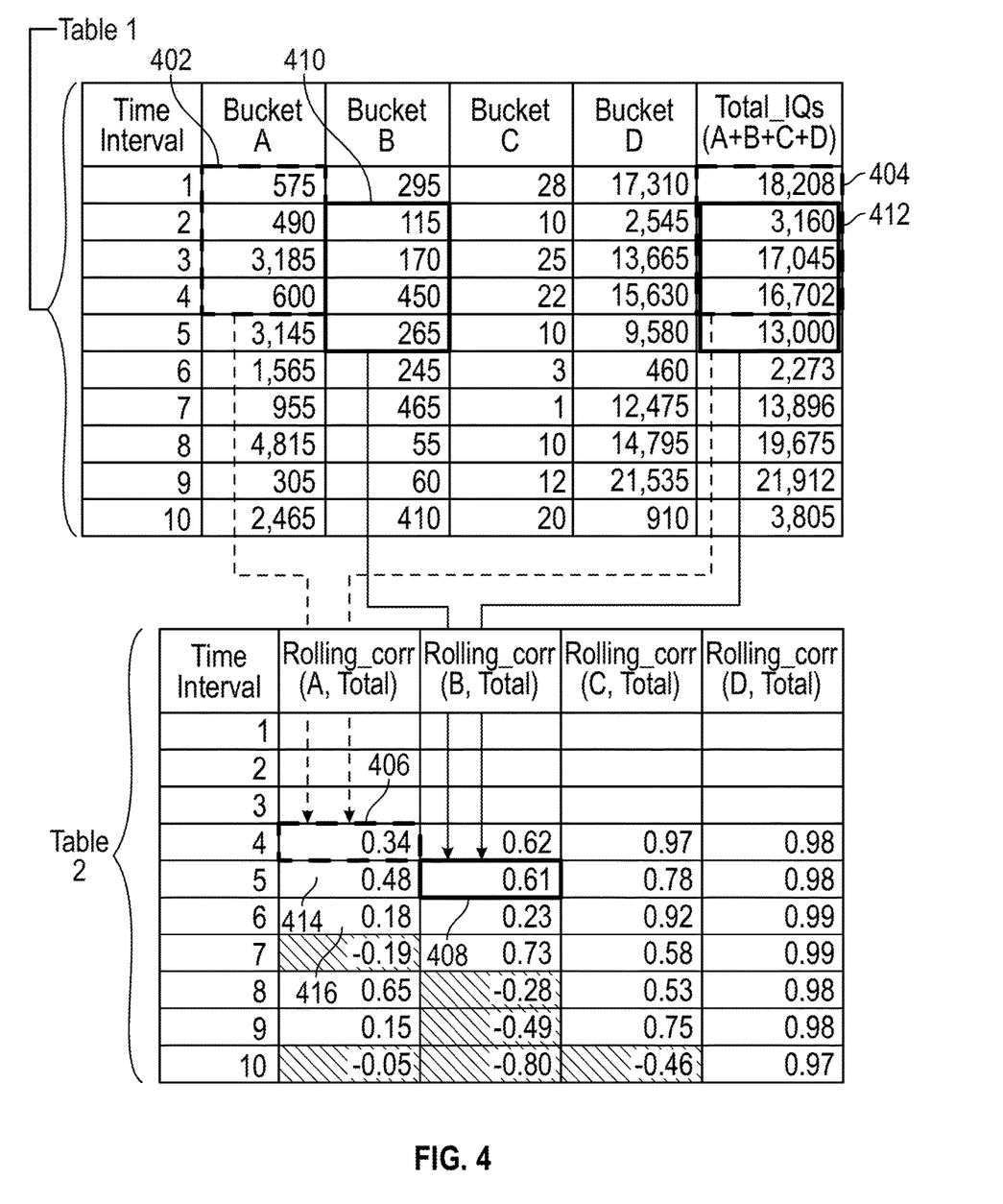
FIG. 4 illustrates an example of computing rolling correlation coefficients, according to some examples.

FIG. 4 illustrates a different example where each time interval includes four buckets A, B, C, and D of I/O operations of different I/O characteristics. FIG. 4 shows two tables, Table 1 and Table 2. Each row of Tables 1 and 2 represent a respective time interval (rows 1-10 in Tables 1 and 2 represent ten different time intervals, respectively).

In Table 1, the Bucket A column includes entries containing values representing a quantity of I/O operations of a first I/O characteristic in the workload, the Bucket B column includes entries containing values representing a quantity of I/O operations of a second I/O characteristic in the workload, the Bucket C column includes entries containing values representing a quantity of I/O operations of a third I/O characteristic in the workload, and the Bucket D column includes entries containing values representing a quantity of I/O operations of a fourth I/O characteristic in the workload.

In the ensuing discussion, a quantity of I/O operations in an entry of a Bucket column can be referred to as a "bucket number of IOs." For example, the bucket number of IOs for time interval 6 in the Bucket A column of Table 1 is 1,565.

In further examples, the correlation function 240 applied to compute a respective correlation coefficient is a rolling coefficient function, which is computed based on values in a rolling window containing multiple time intervals. In the example of FIG. 4, it is assumed that a window includes four time intervals.

In the Bucket A column of Table 1, a window 402 includes rows 1-4 (corresponding to time intervals 1-4) containing four respective bucket numbers of IOs of the first I/O characteristic corresponding to Bucket A. In the Bucket A column, row 1 includes a value 575 that indicates that there are 575 I/O operations of the first I/O characteristic in time interval 1. Similarly, in rows 2-4 of the Bucket A column, values 490, 3,185, and 600 indicate that there are 490 I/O operations of the first I/O characteristic in time interval 2, 3,185 I/O operations of the first/O characteristic in time interval 3, and 600 I/O operations of the first I/O characteristic in time interval 4.

The four bucket numbers of IOs in rows 1-4 of the Bucket A column are part of a window of values (402). FIG. 4 shows another window 410 of values in the Bucket B column, where the window 410 includes values of rows 2-5 indicating respective bucket numbers of IOs of a second I/O characteristic.

The Total_IOs column of Table 1 represents the total number of I/O operations (or more simply, the "total number of IOs") of each time interval. Thus, in row 1, the Total_IOs column has a value of 18,208, which is the sum of the values in row 1 of the Bucket A column, Bucket B column, Bucket C column, and Bucket D column.

A window 404 of values in the Total_IOs column includes the total numbers of IOs in respective time intervals 1, 2, 3, and 4. Another window 412 of values in the Total_IOs column includes the total numbers of IOs in respective time intervals 2, 3, 4, and 5.

In Table 2, entries of a Rolling_corr(A, Total) column include respective rolling coefficient values computed based on respective different windows in the Bucket A column of Table 1, entries of a Rolling_corr(B, Total) column include respective rolling coefficient values computed based on respective different windows in the Bucket B column of Table 1, entries of a Rolling_corr(C, Total) column include respective rolling coefficient values computed based on respective different windows in the Bucket C column of Table 1, and entries of a Rolling_corr(D, Total) column include respective rolling coefficient values computed based on respective different windows in the Bucket D column of Table 1.

A rolling correlation coefficient value (e.g., 0.34 in an entry 406 at time interval 4) in the Rolling_corr(A, Total) column is computed based on the following:

$$\text{Rolling\_CCA} = \text{corr}\left(\sum_{j=1}^{w} XA_j, \sum_{j=1}^{w} Xt_j\right), \quad \text{(Eq. 4)}$$

where Rolling_CCA represents the rolling coefficient value, w represents the window size (in the example of FIG. 4, the window size is 4 time intervals), $XA_j$ represents the bucket number of IOs in row j of the window in the Bucket A column of Table 1, and Xt represents the total number of IOs in row j of the window in the Total_IOs column of Table 1. Each window includes 4 rows in the example of FIG. 4, and row j of the window refers to one of the 4 rows in the window. Thus, for example, in the window 410 of FIG. 4 in the Bucket B column, row 1 of the window 410 corresponds to time interval 2, row 2 of the window 410 corresponds to time interval 3, and so forth.

The rolling correlation coefficient value in the entry 406 of Table 2 is computed based on the bucket numbers of IOs in the window 402 in the Bucket A column of Table 1. Additionally, the rolling correlation coefficient value in an entry 414 of Table 2 is computed based on the bucket numbers of IOs in another window including bucket numbers of IOs for time intervals 2-5 in the Bucket A column of Table 1, the rolling correlation coefficient value in an entry 416 of Table 2 is computed based on the bucket numbers of IOs in a further window including bucket numbers of IOs for time intervals 3-6 in the Bucket A column of Table 1, and so forth.

For Bucket B, a rolling correlation coefficient value, Rolling_CCB, in an entry 408 of the Rolling_corr(B, Total) column is computed based on bucket numbers of IOs in the window 410 in the Bucket B column of Table 1, and total numbers of IOs in the window 412 in the Total IOs column of Table 1, according to the following equation:

$$\text{Rolling\_CCB} = \text{corr}\left(\sum_{j=1}^{w} XB_j, \sum_{j=1}^{w} Xt_j\right), \quad \text{(Eq. 5)}$$

where $XB_j$ represents the number of IOs in row j of the window of the Bucket B column.

The rolling correlation coefficient values for Buckets C and D are computed in similar fashion.

In Table 2, since rolling correlation coefficient values are based on windows of four values in the example, rows 1-3 of Table 2 are blank.

A positive rolling correlation coefficient value indicates that the sum of the bucket numbers of IOs in the respective bucket window (e.g., 402) correlates positively with the sum of the total numbers of IOs in the respective total IO window (e.g., 404). A negative rolling correlation coefficient value indicates that the sum of the bucket numbers of IOs in the respective bucket window correlates negatively with the sum of the total numbers of IOs in the respective total IO window.

In some examples, normalization of the rolling correlation coefficient values is performed. The normalization includes setting any negative rolling correlation coefficient values to zero (or some other predetermined value), and scaling a positive rolling correlation coefficient value, to produce a normalized correlation coefficient value, Normalized_CC, according to the following:

$$\text{Normalized\_CC} = \max(0, CC) \cdot \frac{\sum_{j=1}^{w} (Xb_j)}{\sum_{j=1}^{w} (Xt_j)}. \quad \text{(Eq. 6)}$$

In Eq. 6, max(0, CC) outputs a zero if the rolling correlation coefficient value is negative, and outputs the rolling correlation coefficient value, CC, if positive.

In addition, Eq. 6 scales the positive rolling correlation coefficient value, CC, based on a ratio of the sum of the bucket numbers of IOs in a respective window by the sum of the total numbers of IOs in the respective window.

If the bucket numbers of IOs of a first bucket and the bucket number of IOs of a second bucket both move generally in the same direction (increase in value or decrease in value) as the total numbers of IOs in the Total_IOs column, then the correlation coefficient values computed for the first and second buckets may have similar magnitude, even though one of the two buckets have smaller bucket numbers of IOs that contribute less to the workload. For example, in Table 2, the correlation coefficient values for Bucket C have relatively large values when compared to the correlation coefficient values of Bucket A, even though Bucket A generally has a larger bucket numbers of IOs than Bucket C. The large correlation coefficient values for Bucket C thus do not accurately represent the contribution of the I/O operations of Bucket C relative to the contribution of the I/O operations of Bucket A.

The scaling performed according to Eq. 6 takes into account the relative bucket numbers of IOs of the different buckets so that the scaling reduces the correlation coefficient values computed for Bucket C due to the smaller bucket numbers of IOs of Bucket C.

Figure 5:
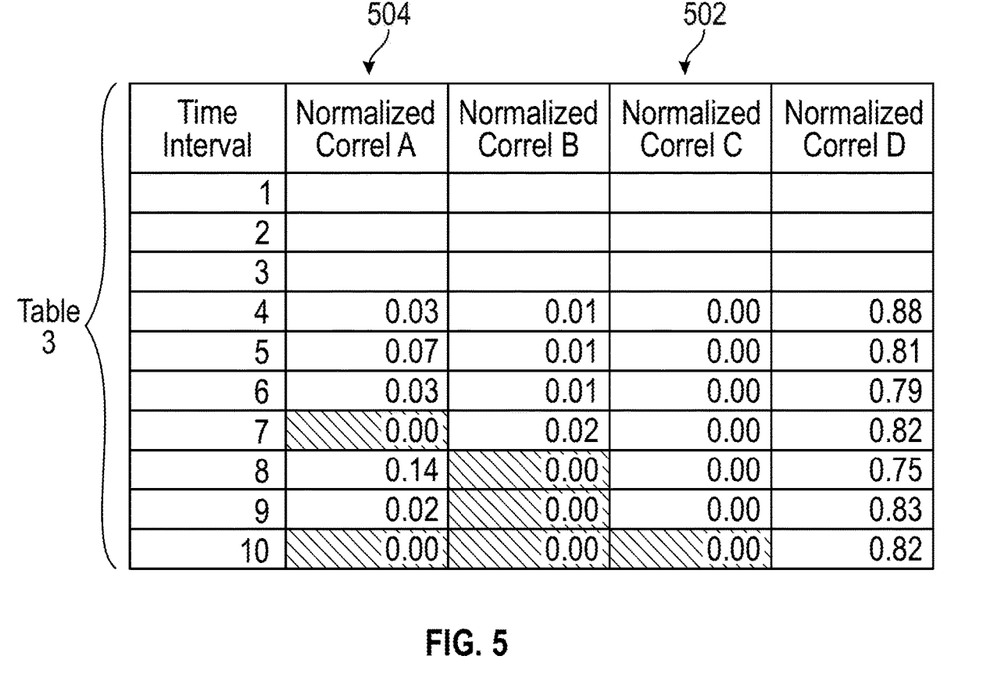
FIG. 5 illustrates example normalized correlation coefficients computed according to some examples.

After the normalization performed using Eq. 6, normalized correlation coefficient values are produced as shown in Table 3 of FIG. 5. The normalized correlation coefficient values for Bucket C in column 502 in Table 3 have much lower values than the corresponding normalized correlation coefficient values for Bucket A in column 504 of Table 3. Even though the normalized correlation coefficient values in column 502 for Bucket C have 0.00 values, it is noted that this is due to rounding up to 2 decimal points.

Once the normalized correlation coefficient values are derived according to Eq. 6, for example, the number of IOs to be added to each bucket at each respective time interval can be derived according to Eq. 7 below:

$$\text{Delta\_IO\_A} = \text{Increased\_Workload} \cdot \frac{\text{Normalized\_CCA}}{\sum_{k=A}^{D} \text{Normalized\_CCk}}, \quad (\text{Eq. 7})$$

where Delta_IO_A represents the delta number of IOs of the increased workload portion (represented by Increased_Workload) to be added to bucket A, Normalized_CCA represents the normalized correlation coefficient for Bucket A as normalized according to Eq. 6, and $$\sum_{k=A}^{D} \text{Normalized\_CCk}$$

represents the sum of the normalized correlation coefficient values, Normalized_CCk (k=A, B, C, D), for Buckets A, B, C, and D in the respective time interval.

Figure 6:
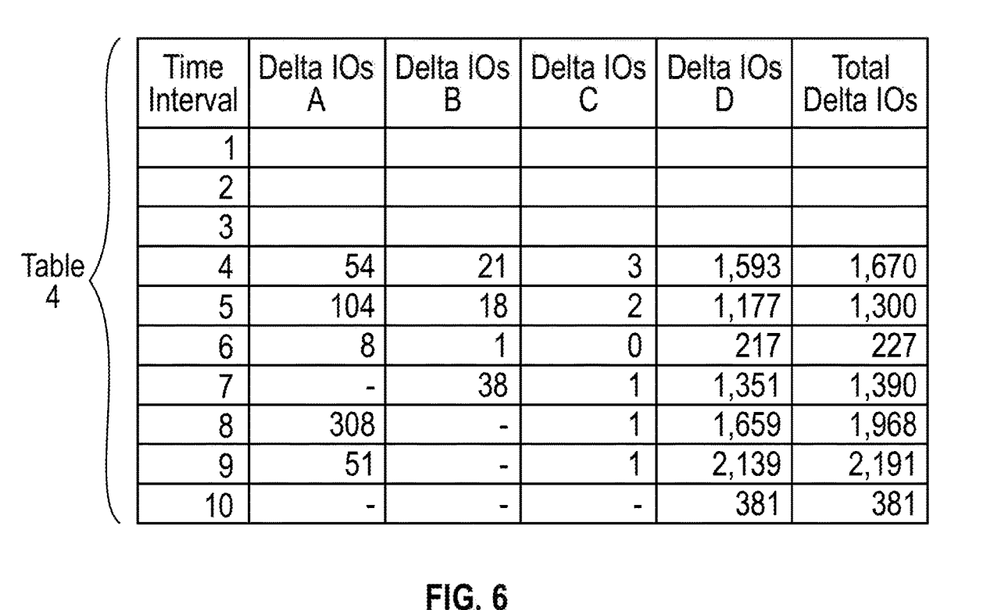
FIG. 6 illustrates example delta numbers of IOs for different buckets computed based on the normalized correlation coefficients, according to some examples.

In Table 4 in FIG. 6, the delta number of Os computed for each bucket in each time interval is provided. In Table 4, a Delta Os A column represents delta numbers of IOs added to Bucket A in respective time intervals, a Delta IOs B column represents delta numbers of IOs added to Bucket B in respective time intervals, a Delta IOs C column represents delta numbers of IOs added to Bucket C in respective time intervals, a Delta IOs C column represents delta numbers of IOs added to Bucket C in respective time intervals, and A Total Delta IOs column includes values representing the total number of delta IOs added to each time interval in Buckets A, B, C, and D collectively. For example, in row 4 of Table 4 for time interval 4, the total number of delta IOs of 1,670 is based on the sum of the delta numbers of IOs for Buckets A, B, C, and D in the Delta IOs A column, Delta IOs B column, Delta IOs C column, and Delta IOs D column, respective, for time interval 4.

Figure 7:
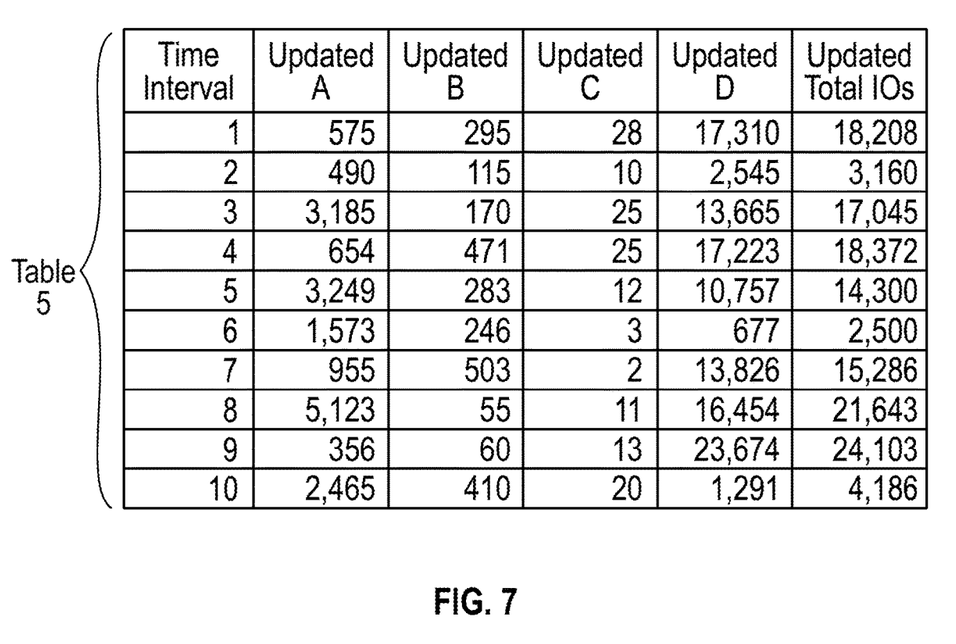
FIG. 7 illustrates example bucket numbers of IOs for different buckets of an updated workload that has been increased from an original workload, according to some examples.

Table 5 in FIG. 7 shows updated numbers of Os of an updated workload (original workload increased by the increased workload portion) in respective Buckets A, B, C, and D, which is based on adding the delta number of IOs for each bucket at each respective time interval to the respective original bucket number of IOs of the workload in Table 1 of FIG. 4.

In Table 5, an Updated A column includes updated numbers of IOs of the updated workload in Bucket A, an Updated B column includes updated numbers of IOs of the updated workload in Bucket B, an Updated C column includes updated numbers of IOs of the updated workload in Bucket C, an Updated D column includes updated numbers of IOs of the updated workload in Bucket D, and an Updated Total IOs column includes updated total numbers of IOs.

Once the updated numbers of IOs in respective buckets of operations of different I/O characteristics in the updated workload are computed, the updated numbers of IOs (in the form of a histogram or other representation) can be provided as inputs to the predictive model 242, such as a regression model, that predicts the latency, saturation, or other operational metric of the storage system 210. An operational metric can be used to indicate a performance and/or usage of the storage system 210, or a resource(s) of the storage system 210. A latency of the storage system 210 or a resource of the storage system 210 can refer to an amount of time it takes for the storage system 210 or resource to perform a workload. A saturation of the storage system 210 or a resource can refer to an amount of the storage system 210 or resource consumed by a workload. In other examples, other operational metrics can be employed.

The predictive model 242 can be trained using training data based on any of various machine learning techniques. Alternatively or additionally, the predictive model 242 can update itself as computations are made by the predictive model, and feedback is provided (by a human or a machine or program) regarding the accuracy of the computations made by the predictive model.

An administrator (using the user console 230 of FIG. 2, for example) can select a period of time in the past as a period of analysis during which the user may wish to evaluate the effect of a workload change on performance of the storage system 210.

The representation of the updated numbers of IOs in respective buckets of operations of different I/O characteristics in the updated workload are input into the predictive model 242 to estimate the new predicted value of the operational metric. For example, a percentage change in latency over the original latency can be computed. This change in latency can be provided as an insight as to what change may be expected in the behavior of the storage system 210 in terms of latency when there is an intended change in the workload during a specific time period. This can help in determining if the expected latency would breach a threshold that may be unacceptable to an enterprise, or whether the expected latency is within acceptable thresholds due to the change in workload.

Similarly, the predictive model 242 can be fed the representation of the updated numbers of IOs of the updated workload to produce an estimated saturation of the storage system 210 or resource, to determine whether the estimated saturation would violate a threshold. The predictive model 242 can be used to estimate values of other operational metrics in other examples.

The storage system workload distribution engine 220 can send reports 228 for viewing in the UI 232 of the user console 230 (FIG. 2). In some examples, the reports 228 can include estimated operational metric values produced by the predictive model 242. In further examples, the reports 228 can also include information of the delta numbers of IOs (such as those in FIG. 6) to add to respective buckets of the updated workload and/or the updated numbers of IOs (such as those in FIG. 7) in respective buckets of the updated workload.

Based on the reports 228, an enterprise can take action to address the expected increase in workload. If the operation metric value(s) produced by the predictive model 242 indicate(s) that the storage system 210 or resource executing the updated workload is expected to operate within target specifications (e.g., estimated latency or saturation is below a specified threshold), then the enterprise can simply allow the storage system 210 to continue operation.

However, if the operation metric value(s) produced by the predictive model 242 indicate(s) that the storage system 210 or resource executing the updated workload is expected to operate outside target specifications (e.g., estimated latency or saturation exceeds a specified threshold), then the enterprise can take action to upgrade the storage system 210 (such as by adding resource(s) or upgrading resource(s)). As another example, the enterprise may choose not to deploy the updated workload on the storage system 210, but may deploy the updated workload on another storage system.

Alternatively, the enterprise can take other actions, such as any one or some combination of: throttling usage of a resource by a workload (such as by reducing a rate at which data requests are submitted to a storage system for data of a collection of storage volumes corresponding to the workload); configuring a quality of service (QoS) setting for the workload type, where the QoS setting can affect a priority of the workload in usage of the resource; changing an allocation of the resource to the workload (such as by changing an amount of the resource allocated to handle data accesses of the data by workloads of the given workload type); migrating data of the workload from a first set of storage devices to a different second set of storage devices; and so forth.

The action(s) taken by the enterprise in response to the operation metric value(s) produced by the predictive model 242 can be performed by a human or by an automated system. The automated system can include a resource management engine 250 in FIG. 2. The resource management engine 250 can automatically perform any of the foregoing actions in response to the operation metric value(s) produced by the predictive model 242.

Rather than compute the predicted change in operational metric value (e.g., latency or saturation) of the storage system 210, the predicted change in operational metric value can be computed for a specific storage volume of the storage system 210, or a subset of storage volumes of the storage system 210.

A "storage volume" can refer to a collection of data, stored in a storage device or multiple storage devices (or portions thereof) that can be managed as a unit. A storage volume is a logical entity for storing data. Storage volumes can be presented to host system(s) (e.g., 202-1 to 202-N in FIG. 2) that can read and write data of the storage volumes. For example, a storage volume can be exported by a storage system to a host system, for use by the host system. More generally, a storage volume can be made available to the host system so that the host system (such as an application in the host system) can access data in the storage volume.

Figure 8:
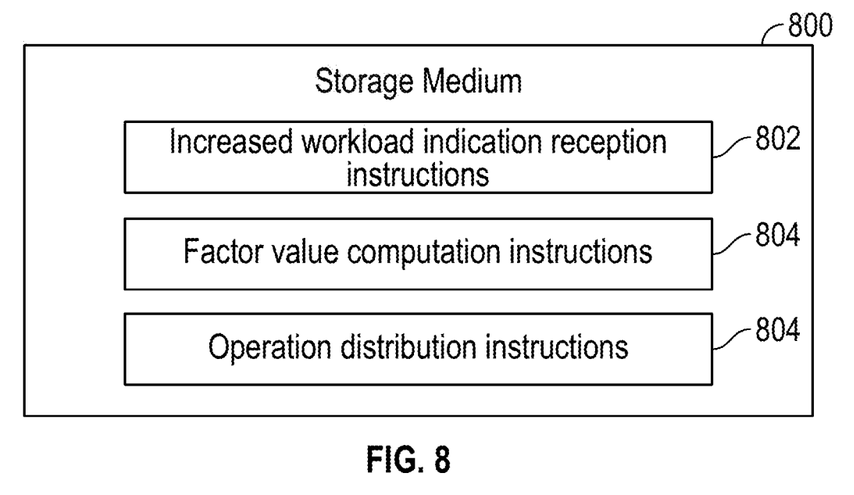
FIG. 8 is a block diagram of a storage medium storing machine-readable instructions according to some examples.

FIG. 8 is a block diagram of a non-transitory machine-readable or computer-readable storage medium 800 storing machine-readable instructions that upon execution cause a system (a computer or multiple computers) to perform respective tasks.

The machine-readable instructions include increased workload indication reception instructions 802 to receive an indication of an increased workload portion to be added to a workload of a storage system, the workload including buckets representing operations of different characteristics (e.g., different I/O sizes, different I/O types, etc.). In some examples, the indication of the increased workload portion is based on an indication that the workload is to be increased by a specified percentage, or that the workload is to be increased by a specified number of operations, and so forth.

The machine-readable instructions further include factor value computation instructions 804 to compute, based on quantities of operations of the different characteristics in the workload, factor values that indicate distribution of quantities of operations of the increased workload portion to the buckets representing operations of the different characteristics.

In some examples, the factor values are based on correlation coefficients. For example, a first factor value is computed based on correlating (using a correlation function) a quantity of operations of a first characteristic in the workload to a total quantity of operations in the workload, a second factor value is computed based on correlating (using the correlation function) a quantity of operations of a second characteristic in the workload to a total quantity of operations in the workload, and so forth.

The computing of a factor value further includes normalizing a correlation value produced by the correlating of the quantity of operations of a respective characteristic in a respective time interval to the total quantity of operations in the respective time interval for the workload. The normalizing of the correlation value can be based on a ratio of the quantity of operations of the respective characteristic to the total quantity of operations.

The machine-readable instructions further include operation distribution instructions 806 to distribute, according to the factor values, the quantities of the operations of the increased workload portion into the buckets of operations of the different characteristics.

Each respective bucket representing operations includes a quantity representing operations of a respective characteristic, and the distributing of the quantity of operations of the increased workload portion to the buckets representing operations causes an increase in a quantity of operations in a bucket of operations. The distributing of the quantity of operations of the increased workload portion to the buckets representing operations causes a first increase in a quantity of operations in a first bucket representing operations according to a first factor value of the factor values, causes a second increase in a quantity of operations in a second bucket representing operations according to a second factor value of the factor values, and so forth.

Figure 9:
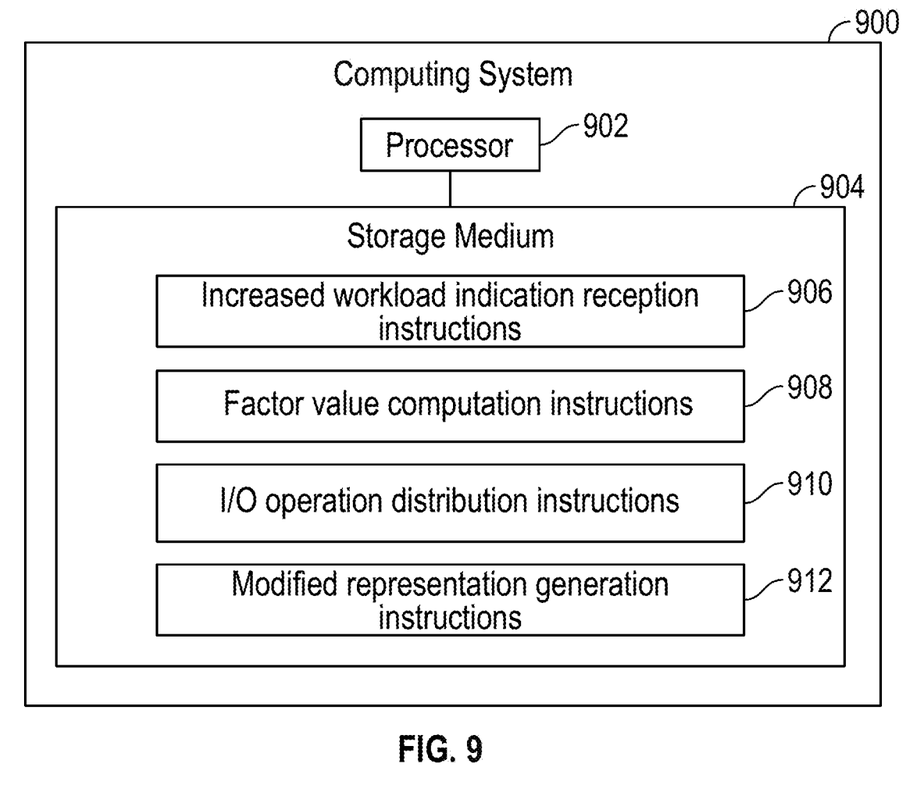
FIG. 9 is a block diagram of a computing system according to some examples.

FIG. 9 is a block diagram of a computing system 900 (implemented as a computer or multiple computers) including a hardware processor 902 (or multiple hardware processors). A hardware processor can include a microprocessor, a core of a multi-core microprocessor, a microcontroller, a programmable integrated circuit, a programmable gate array, a digital signal processor, or another hardware processing circuit.

The computing system 900 further includes a storage medium 904 storing machine-readable instructions executable on the hardware processor 902 to perform various tasks. Machine-readable instructions executable on a hardware processor can refer to the instructions executable on a single hardware processor or the instructions executable on multiple hardware processors.

The machine-readable instructions include increased workload indication reception instructions 906 to receive an indication of an increased workload portion to be added to a workload of a storage system, the workload represented by a representation of buckets representing I/O operations of different characteristics.

The machine-readable instructions further include factor value computation instructions 908 to compute, based on quantities of I/O operations of the different characteristics in the workload, factor values that indicate distribution of quantities of I/O operations of the increased workload portion to the buckets representing I/O operations of the different characteristics.

The machine-readable instructions further include I/O operation distribution instructions 910 to distribute, according to the factor values, the quantities of the I/O operations of the increased workload portion into the buckets representing I/O operations of the different characteristics.

The machine-readable instructions further include modified representation generation instructions 912 to generate a modified representation of buckets representing I/O operations of different characteristics in a modified workload that includes the workload and the increased workload portion.

A storage medium (e.g., 800 in FIG. 8 or 904 in FIG. 9) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a computing system to:
   receive an indication of an increased workload portion to be added to a workload of a storage system, the workload comprising buckets representing operations of different characteristics;
   compute, based on quantities of operations of the different characteristics in the workload, factor values that indicate distribution of quantities of operations of the increased workload portion to the buckets representing operations of the different characteristics; and
   distribute, according to the factor values, the quantities of the operations of the increased workload portion into the buckets representing operations of the different characteristics.

2. The non-transitory machine-readable storage medium of claim 1, wherein the different characteristics comprise different input/output (I/O) sizes, and the buckets representing operations of the workload comprise buckets representing operations of the different I/O sizes, wherein a first bucket of the buckets comprises a quantity of operations of a first I/O size, and a second bucket of the buckets comprises a quantity of operations of a second I/O size.

3. The non-transitory machine-readable storage medium of claim 1, wherein each respective bucket of the buckets includes a quantity of operations of a respective characteristic of the different characteristics, and wherein the distributing of the quantities of the operations of the increased workload portion to the buckets representing operations causes an increase in a quantity of operations in a bucket of the buckets.

4. The non-transitory machine-readable storage medium of claim 3, wherein the distributing of the quantities of the operations of the increased workload portion to the buckets representing operations causes a first increase in a quantity of operations in a first bucket representing operations according to a first factor value of the factor values, and causes a second increase in a quantity of operations in a second bucket representing operations according to a second factor value of the factor values.

5. The non-transitory machine-readable storage medium of claim 1, wherein the instructions upon execution cause the computing system to:
   compute a first factor value of the factor values based on correlating a quantity of operations of a first characteristic of the different characteristics in the workload to a total quantity of operations in the workload.

6. The non-transitory machine-readable storage medium of claim 5, wherein the quantity of operations of the first characteristic in the workload is in a window of time intervals, and the total quantity of operations in the workload is in the window of time intervals.

7. The non-transitory machine-readable storage medium of claim 6, wherein the window is a rolling window, and the computing of the factor values is based on quantities of operations of the different characteristics in rolling windows of time intervals.

8. The non-transitory machine-readable storage medium of claim 5, wherein the computing of the first factor value further comprises normalizing a correlation value produced by the correlating of the quantity of operations of the first characteristic to the total quantity of operations.

9. The non-transitory machine-readable storage medium of claim 8, wherein the normalizing of the correlation value is based on a ratio of the quantity of operations of the first characteristic to the total quantity of operations.

10. The non-transitory machine-readable storage medium of claim 1, wherein the distributing of the quantities of the operations of the increased workload portion into the buckets representing operations produces modified buckets representing operations that include the operations of the workload and the operations of the increased workload portion, and wherein the instructions upon execution cause the computing system to:

predict a performance of the storage system using a predictive model based on the modified buckets representing operations.

11. The non-transitory machine-readable storage medium of claim 10, wherein the predicted performance comprises a predicted latency of the storage system or a resource of the storage system, or a predicted saturation of the storage system or a resource of the storage system.

12. A computing system comprising:
a processor; and
a non-transitory storage medium storing instructions executable on the processor to:
receive an indication of an increased workload portion to be added to a workload of a storage system, the workload represented by a representation of buckets representing input/output (I/O) operations of different characteristics;
compute, based on quantities of I/O operations of the different characteristics in the workload, factor values that indicate distribution of quantities of I/O operations of the increased workload portion to the buckets representing I/O operations of the different characteristics;
distribute, according to the factor values, the quantities of the I/O operations of the increased workload portion into the buckets representing I/O operations of the different characteristics; and
generate a modified representation of buckets representing I/O operations of different characteristics in a modified workload that includes the workload and the increased workload portion.

13. The computing system of claim 12, wherein the indication of the increased workload portion is based on an indication that the workload is to be increased by a specified percentage.

14. The computing system of claim 12, wherein the representation of the buckets representing I/O operations in the workload comprises a histogram of the buckets representing I/O operations in a plurality of time intervals, wherein in each respective time interval of the plurality of time intervals of the histogram, a plurality of buckets represent the buckets representing I/O operations in the respective time interval.

15. The computing system of claim 12, wherein each respective bucket of the buckets representing I/O operations in the workload includes a respective quantity of I/O operations of a respective characteristic of the different characteristics.

16. The computing system of claim 12, wherein the instructions are executable on the processor to compute a respective factor value of the factor values based on correlating a quantity of I/O operations of a respective characteristic of the different characteristics in the workload to a total quantity of I/O operations in the workload.

17. The computing system of claim 16, wherein the quantity of I/O operations of the respective characteristic in the workload is in a window of time intervals, and the total quantity of operations in the workload is in the window of time intervals.

18. The computing system of claim 16, wherein the computing of the respective factor value further comprises normalizing a correlation value produced by the correlating of the quantity of operations of the respective characteristic to the total quantity of operations, wherein the normalizing of the correlation value is based on a ratio of the quantity of I/O operations of the respective characteristic to the total quantity of I/O operations.

19. A method performed by a system comprising a hardware processor, comprising:

receiving an indication of an increased workload portion to be added to a workload of a storage system, the workload comprising buckets representing operations of different input/output (I/O) sizes;

compute, based on quantities of operations of the different I/O sizes in the workload, factor values that indicate distribution of quantities of operations of the increased workload portion to the buckets representing operations of the different I/O sizes;

distribute, according to the factor values, the quantities of the operations of the increased workload portion into the buckets representing operations of the different I/O sizes, to form modified buckets representing operations of the different I/O sizes; and predict a performance of the storage system based on the modified buckets representing operations of the different I/O sizes.

20. The method of claim 19, wherein the computing of the factor values comprises computing each respective factor value of the factor values based on correlating a quantity of operations of a respective I/O size of the different/O sizes in the workload to a total quantity of I/O operations in the workload.

* * * * *